(12) United States Patent
Shinjo

(10) Patent No.: US 6,992,739 B2
(45) Date of Patent: Jan. 31, 2006

(54) LIGHT REFLECTOR AND A LIQUID CRYSTAL DISPLAY DEVICE

(75) Inventor: Masaji Shinjo, Akashi (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 402 days.

(21) Appl. No.: 10/024,782

(22) Filed: Dec. 19, 2001

(65) Prior Publication Data

US 2002/0093604 A1    Jul. 18, 2002

(30) Foreign Application Priority Data

Dec. 27, 2000    (JP)    .............................. 2000-397360

(51) Int. Cl.
   *G02F 1/1335*    (2006.01)

(52) U.S. Cl. .................... 349/113; 349/65; 349/66; 349/67; 349/68; 349/112; 349/114; 349/111

(58) Field of Classification Search ................ 349/112, 349/113, 67; 362/247, 296
See application file for complete search history.

(56) References Cited

U.S. PATENT DOCUMENTS

| | | | | |
|---|---|---|---|---|
| 6,018,379 | A * | 1/2000 | Mizobata et al. | 349/112 |
| 6,097,458 | A * | 8/2000 | Tsuda et al. | 349/113 |
| 6,407,786 | B1 * | 6/2002 | Yamamoto et al. | 349/113 |
| 6,452,653 | B1 * | 9/2002 | Yamanaka et al. | 349/113 |
| 6,469,755 | B1 * | 10/2002 | Adachi et al. | 349/62 |
| 6,490,018 | B1 * | 12/2002 | Taira | 349/113 |
| 6,522,375 | B1 * | 2/2003 | Jang et al. | 349/113 |
| 6,539,155 | B1 * | 3/2003 | Broeng et al. | 385/125 |

FOREIGN PATENT DOCUMENTS

| | | | |
|---|---|---|---|
| EP | 0549890 | * | 7/1993 |
| EP | 0549890 A1 | | 7/1993 |
| JP | 11-183730 | * | 12/1997 |
| JP | 11-84116 | * | 3/1999 |
| JP | 9-288274 | * | 7/1999 |

OTHER PUBLICATIONS

Patent Abstracts of Japan, Shin Jong Y, "Reflection Type Liquid Crystal Display Device And Its Manufacture," Publication No. 2000292785, Oct. 20, 2000, Application No. 2000065723, Mar. 6, 2000.

Patent Abstracts of Japan, Richiyaado Ran, "Reflection Type Liquid Crystal Display Element," Publication No. 08227071, Sep. 3, 1996, Application No. 07033294, Feb. 22, 1995.

* cited by examiner

*Primary Examiner*—Evan Pert
*Assistant Examiner*—Fazli Erdem

(57) ABSTRACT

The invention provides a light reflector and a light-reflective liquid crystal display device with the improved image quality. A plurality of projection sets 8 are formed on the substrate 1, each of said plurality of projection sets 8 comprising one projection 6 and seven projections 6 arranged around said one projection 6. After the formation of those projection sets 8, the planarizing film 9 and then the pixel electrode 10 are formed in sequence.

9 Claims, 4 Drawing Sheets

LIGHT REFLECTOR AND A LIQUID CRYSTAL DISPLAY DEVICE

TECHNICAL FIELD

The invention relates to a light reflector which reflects light, and liquid crystal display device.

BACKGROUND OF THE INVENTION

A transmissive type of liquid crystal display device has been known which provided with backlight. A reflective type of liquid crystal display device also has been known which utilizes the external light. The reflective type liquid crystal display device comprises pixel electrodes having a metal of high reflectivity (Al or Ag etc.) in order to reflect the external light. Especially, such reflective liquid crystal display device needs to scatter the external light reflected by the pixel electrodes in various directions in order to improve the quality of the image to be displayed. For that purpose, the surface of the pixel electrodes is usually provided with some projected or recessed portions, so that the external light could be scattered in various directions.

The external light could be scattered in various directions by means of the aforementioned provision of projected or recessed portions. However, if such projected or recessed portions are simply arranged without any special consideration, the interference color occurs in the displayed image due to the interference of the light beams reflected by the pixel electrodes, and as a result, there may be the possibility of the degradation of the image quality.

From the aforementioned viewpoint, it is an object of the present invention to provide a light reflector and a liquid crystal display device with the improved image quality.

SUMMARY OF THE INVENTION

The invention provides a light reflector having a plurality of projected portions or recessed portions, characterized in that said reflector has n first projected portions or recessed portions at positions corresponding respectively to vertexes of an equilateral n-gon where n is an odd number which is equal to or greater than 3. With this structure, it is possible to suppress the interference of the light reflected by the light reflector.

In a first aspect of the invention, the aforementioned light reflector preferably comprises a plurality of projected portion sets or recessed portion sets, each of said projected portion sets or recessed portion sets consisting of said n first projected portions or recessed portions. By virtue of such plurality of projected portion sets or recessed portion sets, the light reflector can be provided with the large number of projected portions or recessed portions.

In a second aspect of the invention, said plurality of projected portion sets or recessed portion sets of the aforementioned light reflector are preferably constructed such that at lease two of said plurality of projected portion sets or recessed portion sets are arranged around one of said plurality of projected portion sets or recessed portion sets, each of said at least two projected portion sets or recessed portion sets being adjacent to said one projected portion set or recessed portion set. With this structure, the light reflector can be provided with the large number of projected portion sets or recessed portion sets.

Moreover, in a third aspect of the invention, said plurality of projected portion sets or recessed portion sets of the aforementioned light reflector are preferably constructed such that six of said plurality of projected portion sets or recessed portion sets are arranged around one of said plurality of projected portion sets or recessed portion sets, each of said six projected portion sets or recessed portion sets being adjacent to said one projected portion set or recessed portion set. With this structure, the projected portion sets or recessed portion sets can be arranged in the highest density.

Furthermore, in a fourth aspect of the invention, the aforementioned light reflector preferably comprises at least one second projected portion or recessed portion in an area surrounding by said n first projected portions or recessed portions. By providing at least one second projected portion or recessed portion within an area surrounded by said n first projected portions or recessed portions in addition to the aforementioned n first projected portions or recessed portions, the light reflector can comprise a higher number of projected portions or recessed portions.

In a fifth aspect of the invention, the number of said first projected portions or recessed portions is preferably seven. In accordance with the seven first projected portions or recessed portions, it is possible to provide the light reflector with the projected portions or recessed portions in high density.

Besides, in a sixth aspect of the invention, in the case of defining respective lines connecting adjacent projected portions or recessed portions of said n first projected portions or recessed portions with respect to each of said plurality of projected portion sets or recessed portion sets, said respective lines associated with one of said plurality of projected portion sets or recessed portion sets of the aforementioned light reflector preferably extend in directions which are different from those of said respective lines associated with remaining projected portion sets or recessed portion sets. With this structure, the interference of the light reflected by the light reflector can be efficiently suppressed.

The invention also provides a liquid crystal display device comprising pixel electrodes formed at areas corresponding to respective pixels wherein the light reflector as aforementioned is used as a pixel electrode. By constructing the pixel electrodes of the liquid crystal display device as mentioned in any one of claims 1 to 7, the occurrence of the interference color in the displayed image can be suppressed.

In particular, in the liquid crystal display device in accordance with the invention, n projections are preferably provided below said pixel electrode at positions corresponding respectively to vertexes of an n-gon where n is an odd number which is equal to or greater than 3. With this structure, the pixel electrode can comprise projected portions.

DETAILED DESCRIPTION OF THE INVENTION

Following will explain, with reference to FIG. 1 through FIG. 9, an embodiment in accordance with the present invention in which a light reflector is applied to a reflective type of liquid crystal display device. However, the invention may be applied to any other device than the liquid crystal display device.

Figure 1:
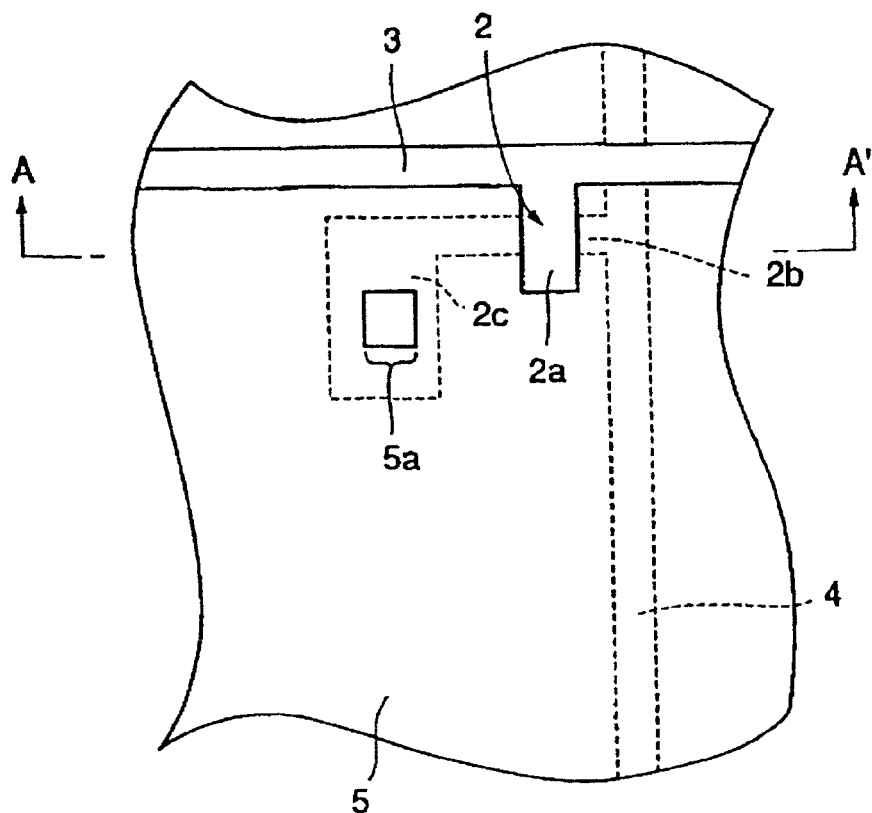
FIG. 1 is a plan view illustrating the state just after the TFT 2 has been formed on the substrate 1.
Figure 2:
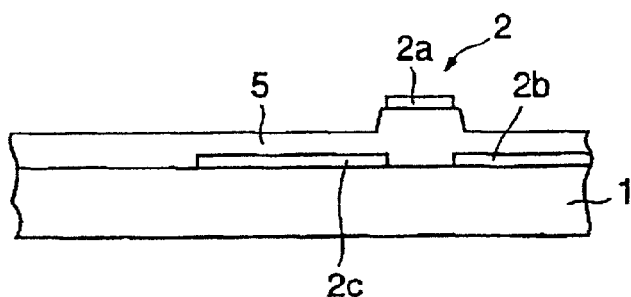
FIG. 2 is a cross-sectional view taken along a A–A' direction in FIG. 1.

FIG. 1 is a plan view illustrating the state just after the TFT 2 has been formed on the substrate 1. FIG. 2 is a cross-sectional view taken along an A–A' direction in FIG. 1. It should be noted that a TFT for only one pixel area is shown in FIG. 1 but many TFTs are formed in other pixel areas in the same way.

A TFT 2 is formed on a substrate 1 as shown in FIG. 2. A gate electrode 2a of the TFT 2 is formed so as to be integrated with a gate line 3, and a source electrode 2b of the TFT 2 is formed so as to be integrated with a source line 4 as seen in FIG. 1. Besides a drain electrode 2c of the TFT 2 is formed in L-character shape. The source electrode 2b, the source line 4 and the drain electrode 2c are covered with a silicon-nitride film 5, on which the gate electrode 2a and the gate line 3 are formed. It should be noted that a-Si and other films, which are formed below the silicon-nitride film 5, are not shown herein. A contact hole 5a is formed in the silicon-nitride film 5 so as to expose a potion of the drain electrode 2c as shown in FIG. 1. The contact hole 5a is formed in order to connect the drain electrode 2c to a pixel electrode 10 that will be later explained (see FIG. 5 for example). After having formed such structure of the TFT 2 as above described but before forming pixel electrodes in each pixel area, a plurality of projections are formed as explained below.

Figure 4:
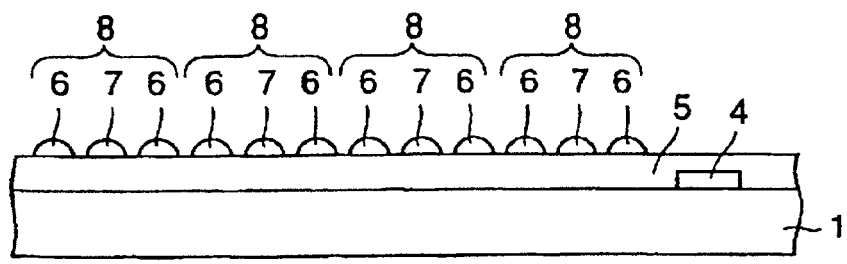
FIG. 4 is a cross-sectional view taken along a B–B' direction in FIG. 3.
Figure 3:
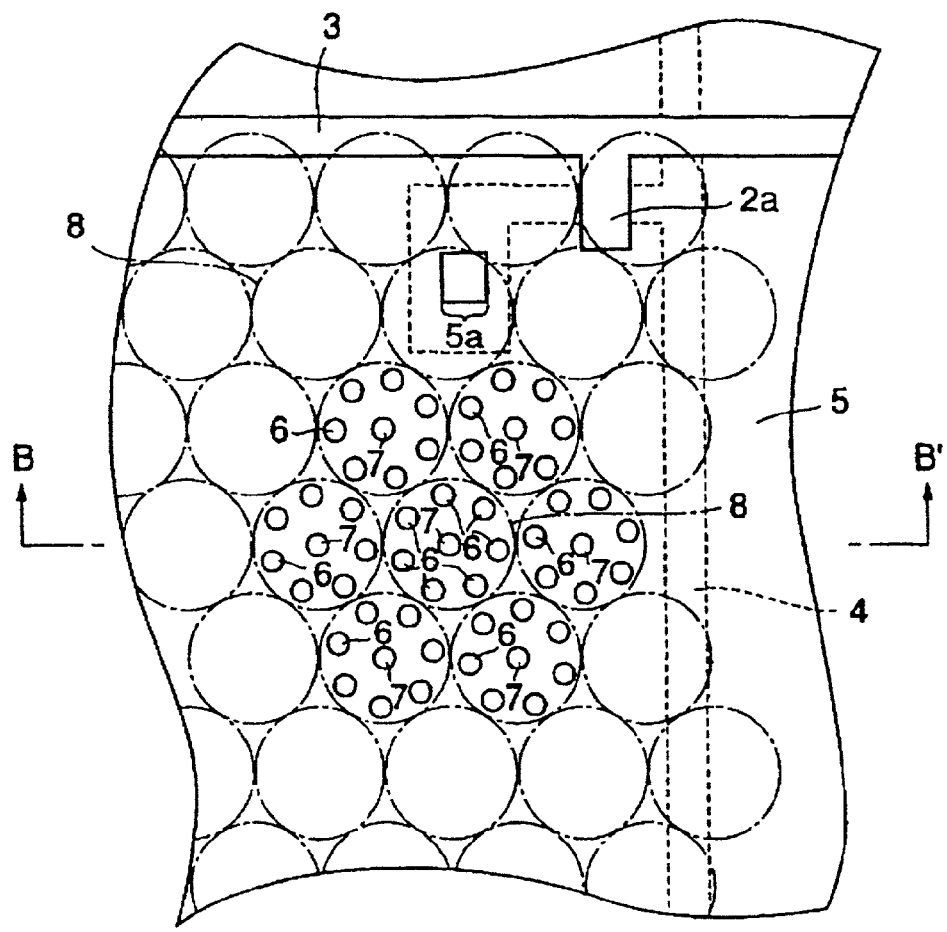
FIG. 3 is a plan view illustrating the state in which many projections 6, 7 have been formed in the pixel areas.

FIG. 3 is a plan view illustrating the state in which many projections 6, 7 have been formed in the pixel areas. FIG. 4 is a cross-sectional view taken along a B–B' direction in FIG. 3.

Projections 6 and 7 are obtained by forming an organic layer comprising an acrylic resin material for example on the substrate 1 and then by patterning the organic layer in the form of the projections 6 and 7. In this embodiment, a plurality of projection set 8 (each of which is surrounded by a dot-and-dash-line ) are formed each of which consisting of one projection 7 and seven projections 6 arranged around that projection 7. In FIG. 3, dot-and-dash-lines representing projections set 8 are not described in a portion of area shown in FIG. 3. However, it should be noted that there are projection sets 8 in said portion in which dot-and-dash-lines are not described. In addition, for ease of viewability, projections 6 and 7 are illustrated with respect to only some of all projection sets 8. However, it should be noted that each of all projection sets 8 comprises one projection 7 and seven projections 6 arranged around that projection 7.

Figure 6:
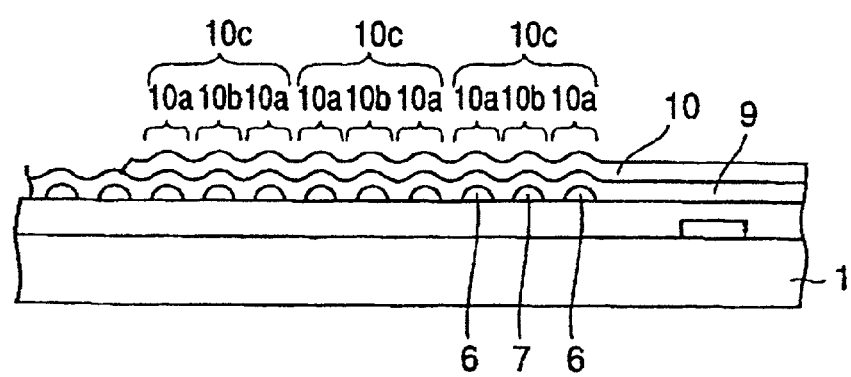
FIG. 6 is a cross-sectional view taken along a C–C' direction in FIG. 5.
Figure 5:
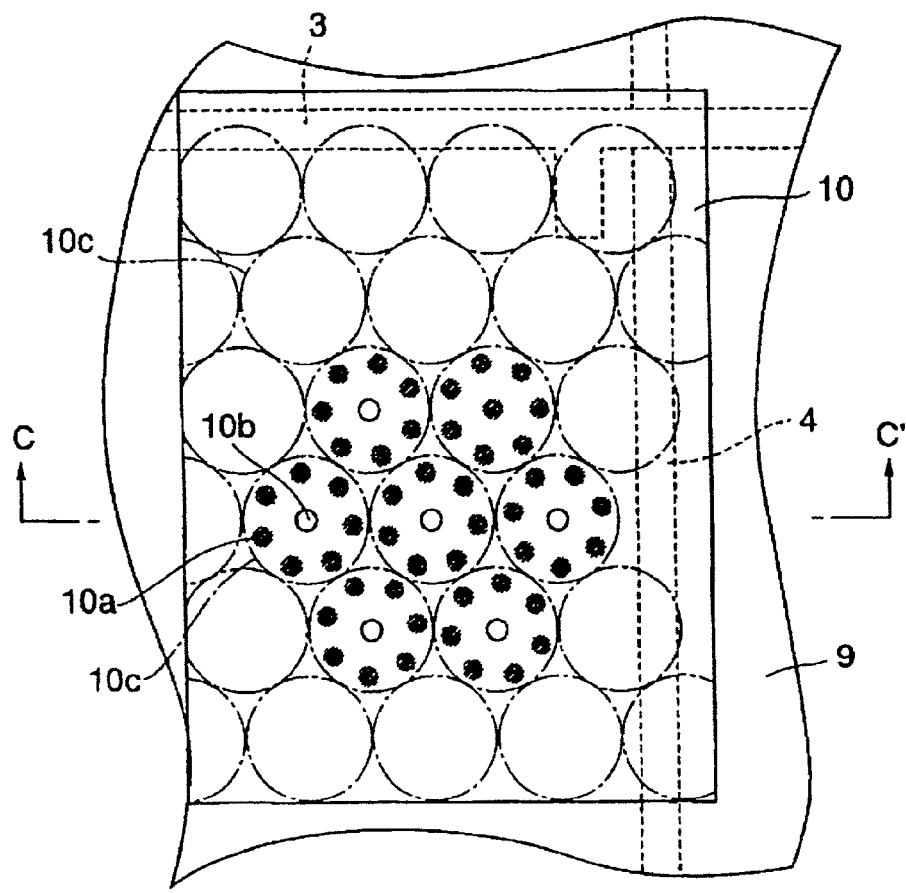
FIG. 5 is a plan view illustrating the state in which the planarizing film 9 and the pixel electrode 10 have been formed.

After the projections 6 and 7 have been formed as mentioned above, a planarizing film and pixel electrodes are formed in sequence. FIG. 5 is a plan view illustrating the state in which the planarizing film 9 and the pixel electrode 10 have been formed. FIG. 6 is a cross-sectional view taken along a C–C' direction in FIG. 5.

After the projections 6 and 7 have been formed (see FIG. 3), a planarizing film 9 is formed so as to cover the projections 6 and 7 as seen in FIG. 6. Then, pixel electrode 10 is formed in each of pixel areas by depositing a material mainly containing Al for example on the planarizing film 9 and then by patterning the deposited material. Below the pixel electrodes 10, a plurality of projections 6 and 7 are formed through the planarizing film 9. Accordingly, the pixel electrode 10 has some projected portions 10a which are following the shape of the corresponding projections 6 and some projected portions 10b which are following the shape of the corresponding projections 7. Besides, since seven projections 6 are arranged around one projection 7 (see FIG. 3), seven projected portions 10a are provided around one projected portion 10b within the pixel electrode 10 as illustrated in FIG. 5. Accordingly, the pixel electrode 10 comprises a plurality of projected portion sets 10c each of which consists of one projected portion 10b and seven projected portions 10a (which are surrounded by dot-and-dash-lines). In FIG. 5, each projected portion 10b is represented by a blank circle and each projected portion 10a is represented by a hatched circle. These projected portions 10a and 10b on the pixel electrode 10 may have a function of suppress the interference among the light beams reflected by the pixel electrode 10. This reason will be below explained together with the structure of the projected portion set 10c of the pixel electrode.

Figure 7:
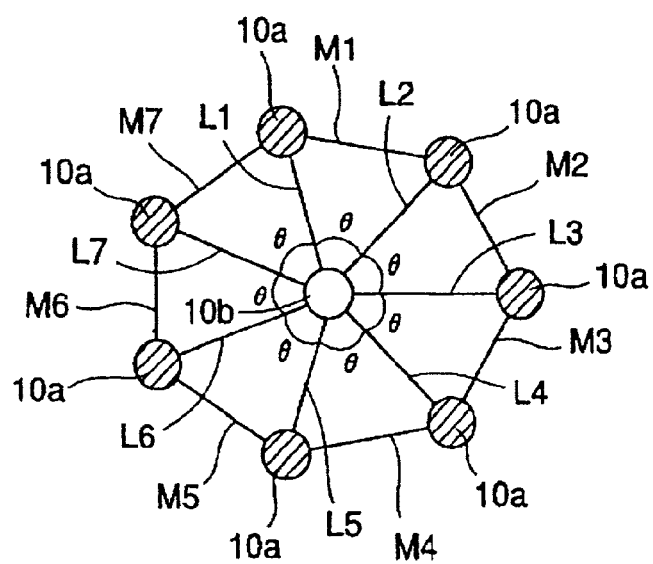
FIG. 7 illustrates a schematically-enlarged view of a projected portion set 8.

FIG. 7 illustrates a schematically-enlarged view of a projected portion set 10c. The projected portion set 10c comprises one projected portion 10b and seven projected portions 10a surrounding the projected portion 10b. These seven projected portions 10a are located at positions corresponding respectively to vertexes of an regular heptagon and one projected portion 10b is located at the center of the area surrounded by these seven projected portions 10a. Here, assume virtual lines L1–L7 that connect one projected portion 10b to each of seven projected portions 10a. Since these seven projected portions 10a are located at positions corresponding respectively to the vertexes of the regular heptagon, an angle θ defined by any adjacent pair of the lines L1–L7 is θ=2π/7. Accordingly, it can be seen that lines L1–L7 extend in such directions that are all different each other (in other words, none of lines L1–L7 extends in parallel with any other line). Furthermore, assume virtual lines M1–M7 that connect adjacent projected portions 10a. These lines M1–M7 also extend in such directions that are all different each other. Besides, even for all lines including the lines L1–L7 and the lines M1–M7, there is no line extending in parallel with any other line. In accordance with such structure of this embodiment in which the seven projected portions 10a are located at positions corresponding respectively to vertexes of an regular heptagon and one projected portion 10b is located at the center of the area surrounded by these seven projected portions 10a, the lines L1–L7 and M1–M7 connecting adjacent projected portions are formed so as to extend in different directions each other (in other words, there is no line extending in parallel with any other line). These projected portions, which are formed in such a way that the lines described above extend in different directions each other (in other words, there is no line extending in parallel with any other line) as shown in FIG. 7, will be referred to as "irregular projected portions" hereinafter. In this embodiment, projections 6 and 7 are formed below the pixel electrode 10 such that these irregular projected portions 10a and 10b can be formed in the pixel electrode 10. It should be noted that the diameter of the projections 6 and 7 is defined to be about 2 μm and the distance between the projections 6 and the projection 7 is to be about 8 μm in this embodiment. However, these values may be variable as needed.

In contrast, there occurs a disadvantage if the number of projected projections 10a is selected to be six rather than seven as just explained above. This disadvantage will be below explained with reference to FIG. 8.

Figure 8:
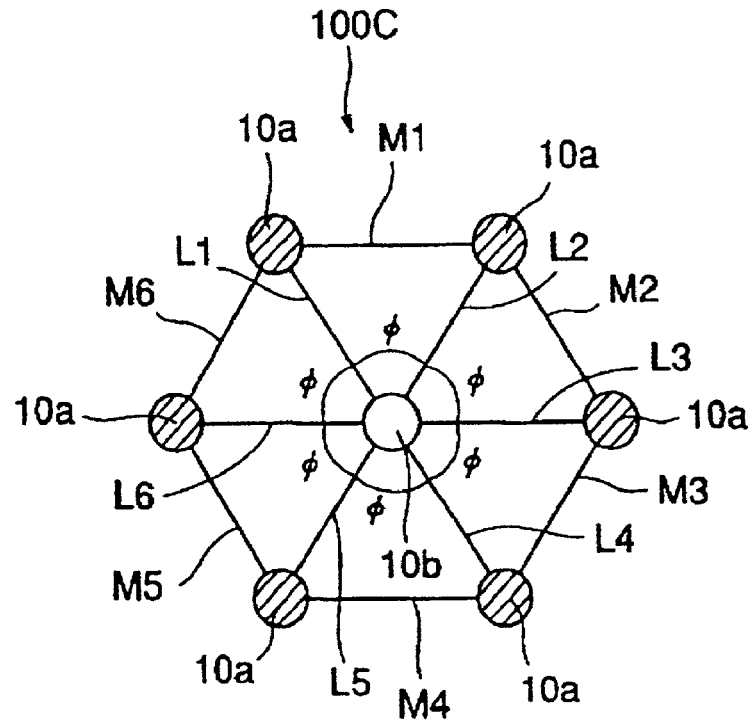
FIG. 8 illustrates a schematically-enlarged view of a projected portion set in which six projection portions 7 are disposed around one projected portion 6.

FIG. 8 illustrates a schematically-enlarged view of a projected portion set 100c in which six projection portions 10a are provided. These six projected portions 10a are located at positions corresponding respectively to vertexes of an regular hexagon and one projected portion 10b is located at the center of the area surrounded by these six projected portions 10a. Here, assume virtual lines L1–L6 that connect one projected portion 10b to each of six projected portions 10a. Since these six projected portions 10a are located at positions corresponding respectively to the vertexes of the regular hexagon, an angle φ defined by any adjacent pair of the lines L1–L6 is θ=2π/6. Accordingly, it can be seen that lines L3 and L6 extend in the same directions. Furthermore, assuming virtual lines M1–M6 that connect adjacent projected portions 10a, it can be seen that the lines M1 and M4 extend in parallel with the lines L3 and L6. These projected portions, which are formed in such a way that the lines extend in the same directions each other (in other words, there exist some parallel lines) as shown in FIG. 8, will be referred to as "regular projected portions" hereinafter. These regular projected portions 10a and 10b may disadvantageously bring out some interference among the light beams reflected by the projected portions 10a and 10b.

In accordance with this embodiment of the invention, however, the interference among the light beams reflected by the pixel electrode 10 may not easily occur because the pixel electrode 10 comprises such irregular projected portions that seven projected portions 10a are arranged around one projected portion 10b.

Besides, as aforementioned, in order to improve the quality of the image to be displayed, it is required to scatter the light reflected by the pixel electrode 10 toward different directions as much as possible. This may be achieved by providing each pixel electrode 10 with the large number of projected portions 10a and 10b. In order to provide each pixel electrode 10 with the large number of projected portions 10a and 10b, such many projected portions 10a and 10b need to be arranged as in higher density as possible within each pixel electrode 10. For this purpose, in accordance with this embodiment of the invention, six projected portion sets 10c are positioned around any one of the projected portion sets 10c as shown in FIG. 5. By arranging six projected portion sets 10c around any one of projected portion set 10c, it is possible to arrange projected portion sets 10c in the highest density, and as a result, it is possible to provide one pixel electrode 10 with the larger number of projections 10a and 10b.

Figure 9:
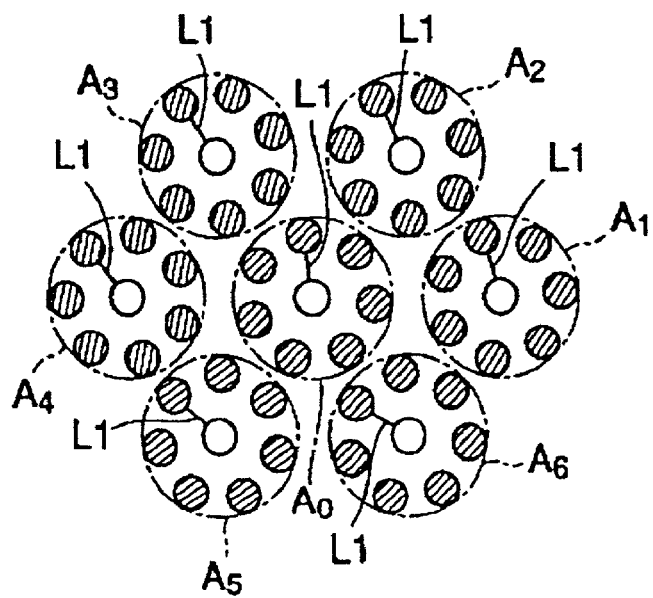
FIG. 9 illustrates a positioning relation between one projected portion set 8 and six projected portion sets 8 arranged around that projected portion set 8.

Furthermore, in accordance with this embodiment, in order to more efficiently suppress the interference of the light reflected by the pixel electrode 10, the positional relation between one projected portion set 10c and six projected portion sets 10c surrounding that projected portion set 10c is defined as follows:

FIG. 9 is to explain such positional relation. The FIG. 9 shows one projected portion set A0 and six projected portion sets A1–A6 arranged around that projected set A0. For the convenience of the explanation, in FIG. 9, these seven projected portion sets are marked respectively with reference signs A0–A6 rather than the reference sign "10c" in order to easily distinguish each of these seven projected portion sets.

As aforementioned with reference to FIG. 7, each of the projected portion sets A0–A6 comprises irregular projected portions so as to avoid the interference among the light beams reflected by the pixel electrode 10 as much as possible. In other words, considering any one of the projected portion sets A0–A6, there exists only irregular projected portion within the area of the considered one projected portion set. However, if there is a case where only the irregular projected portions exist within the area of one projected portion set but regular projected portions exist within the area containing all of the seven projected portion sets A0–A6, said case may cause the interference of the light. Accordingly, in accordance with this embodiment of the invention, the projected portion sets A0–A6 are arranged such that only the irregular projected portions exist within the area containing all of the seven projected portion sets A0–A6. Such arrangement of the projected portion sets A0–A6 will be below explained.

In the case of trying to provide the area containing all of the seven projected portion sets A0–A6 with only the irregular projected portions, it is required that when comparing any two of projected portion sets (for example, the projected portion sets A1 and A2), the lines L1–L7 and M1–M7 of one of the two projected portion sets and the lines L1–L7 and M1–M7 of the other should extend in the different directions each other (in other words, none of them should be in parallel with any other). For that purpose, in this embodiment, considering that an angle θ defined by two adjacent lines L1 and L2 is θ=2π/7 and that the total number of the projected portion sets A0–A6 is seven, the positions of the projected portions sets Am (m=1,2,3,4,5,6) relative to the projected portion set A0 are determined as follows: specifically, the position of each of the projected portions sets A1–A6 relative to the projected portion set A0 is determined in such a way that an angle defined by the line L1 of the projected portion set A0 and the line L1 of the projected portion set Am is defined by equation (1).

$$(2\pi/7) \div 7 * m \qquad (1)$$

For example, the projected portion set A1 is arranged in such a way that the angel defined by the line L1 of the projected portion set A1 and the line L1 of the projected portion set A0 has a value of $(2\pi/7) \div 7 * 1 = 2\pi/49$.

The angle represented by the equation (1) is obtained by first dividing $(2\pi/7)$ by the total number (7 in this example) of the projected portion sets A0–A6 and then multiplying the $(2\pi/7) \div 7$ by m (=1,2,3,4,5,6). Therefore, the lines L1–L7 and M1–M7 of any one projected portion set and the lines L1–L7 and M1–M7 of the other projected portion sets can extend in the different directions. Thus, only the irregular projected portions can be obtained within the area containing all of the seven projected portion sets A0–A6, as a result of this, the interference of the light can be sufficiently suppressed. It should be noted that although the positions of the projected portion sets A0–A6 are determined in accordance with the equation (1) in this embodiment, this method is only one example and any other method for determining the positions of the projected portion sets A0–A6 may be possible.

Besides, although each projected portion set 10c is provided with seven projected portions 10a surrounding one projected portion 10b in accordance with this embodiment of the invention, the number of the projected portions 10a of each projected portion set 10c is not necessarily seven but may be any odd number which should be equal to or larger than three. However, if the number of the projected portions 10a of each projected portion set 10c is less than seven (for example, five), the total number of the projected portions 10a contained in the pixel electrode 10 will become decreased. On the other hand, if the number of the projected portions 10a of each projected portion set 10c is more than seven (for example, nine), it is required to make the distance between the projected portions 10a and the projected portion 10b longer than would be the case of seven projected portions 10a in order to avoid the mutual contact between adjacent projected portions 10a, and, as a result, the total number of the projected portions 10a contained in the pixel electrode 10 will also become decreased. Thus, the total number of the projected portions 10a contained in the pixel electrode 10 should be preferably seven to arrange the projected portions 10a within the pixel electrode 10 in the highest density. Of course, as long as the pixel electrode 10 is able to scatter the light efficiently, the number of the projected portions 10a of each projected portion set 10c does not need to be limited to seven but may be any number like five or nine for example.

In this embodiment, each projected portion set 10c comprises not only seven projected portions 10a but also one projected portion 10b within the area surrounded by those seven projected portions 10a. In accordance with this structure, any one projected portion set 10c can comprise the larger number of the projected portions without widening the portion of the pixel electrode 10 occupied by any one projected portion set 10c, and as a result, the light can be scattered more efficiently. Further, although each projected portion set 10c comprises only one projected portion 10b in the embodiment of the invention, it may comprise two and more projected portions 10b. It should be also noted that each projected portion set 10c does not necessarily need to comprise projected portions 10b as along as the pixel electrode 10 can efficiently scatter the light.

Furthermore, although six projected portion sets 10c are arranged around any one projected portion set 10c in the embodiment of the invention, the number of projected portion sets 10c arranged around any one projected portion set 10c may be variable depending on conditions such as the light-scattering characteristic required of the pixel electrode 10.

Furthermore, in this embodiment, the projected portions 10a and 10b are provided with the pixel electrode 10. However, the pixel electrode 10 may comprise recessed portions instead of the projected portions. The recessed portions have the same function as the projected portion in terms of reflecting the light toward various directions, and that the interference of the light beams reflected by the pixel electrode 10 could be suppressed even if the recessed portions are provided instead of the projected portions. In the case of trying to form the recessed portions instead of the projected portions in the pixel electrode 10, not the projections 6 and 7 but the film comprising a plurality of recesses or through-holes can be provided below the pixel electrode 10. By means of such film, the pixel electrode may be formed which depends on the patterns of those recesses or through-holes, so that the pixel electrode can comprise a plurality of recessed portions.

As explained above, a light reflector and a light-reflective liquid crystal display device with the improved image quality can be provided in accordance with the invention.

What is claimed is:

1. A light reflector having a plurality of projected portions or recessed portions, wherein:

the reflector has n first projected portions or recessed portions at positions corresponding respectively to vertexes of an equilateral polygon having n sides, n being an odd number equal to or greater than 3;

the light reflector comprises a plurality of projected portion sets or recessed portion sets, each of the projected portion sets or recessed portion sets consisting of said n first projected portions or recessed portions;

the plurality of projected portion sets or recessed portion sets are constructed such that at least two of the plurality of projected portion sets or recessed portion sets are arranged around one of the plurality of projected portion sets or recessed portion sets, each of the at least two projected portion sets or recessed portion sets being adjacent to said one projected portion set or recessed portion set; and said plurality of projected portion sets or recessed portion sets are constructed such that six of said plurality of projected portion sets or recessed portion sets are arranged around one of said plurality of projected portion sets or recessed portion sets, each of said six projected portion sets or recessed portion sets being adjacent to said one projected portion set or recessed portion set.

2. A light reflector as claimed in claim 1, wherein said reflector comprises at least one second projected portion or recessed portion in a area surrounding by said n first projected portions or recessed portions.

3. A light reflector as claimed in claim 1, wherein, in the case of defining respective lines connecting adjacent projected portions or recessed portions of said n first projected portions or recessed portions with respect to each of said plurality of projected portion sets or recessed portion sets, said respective lines associated with one of said plurality of projected portion sets or recessed portion sets extend in directions which are different from those of said respective lines associated with remaining projected portion sets or recessed portion sets.

4. A light reflector having a plurality of projected portions or recessed portions, wherein the reflector has n first projected portions or recessed portions at positions corresponding respectively to vertexes of an equilateral polygon having n sides, n being an odd number which is equal to or greater than 3; and the number of said first projected portions or recessed portions is seven.

5. A light reflector having a plurality of projected portions or recessed portions, wherein:

the reflector has n first projected portions or recessed portions at positions corresponding respectively to vertexes of an equilateral polygon having n sides, n being an odd number equal to or greater than 3;

the light reflector comprises a plurality of projected portion sets or recessed portion sets, each of the projected portion sets or recessed portion sets consisting of said n first projected portions or recessed portions;

the plurality of projected portion sets or recessed portion sets are constructed such that at least two of the plurality of projected portion sets or recessed portion sets are arranged around one of the plurality of projected portion sets or recessed portion sets, each of the at least two projected portion sets or recessed portion sets being adjacent to said one projected portion set or recessed portion set; and in the case of defining respective lines connecting adjacent projected portions or recessed portions of said n first projected portions or recessed portions with respect to each of said plurality of projected portion sets or recessed portion sets, said respective lines associated with one of said plurality of projected portion sets or recessed portion sets extend in directions which are different from those of said respective lines associated with remaining projected portion sets or recessed portion sets.

6. A liquid crystal display device comprising pixel electrodes formed at areas corresponding to pixels, respectively, each pixel being associated with a light reflector having aplurality of n first projected portions or recessed portions at positions corresponding respectively to vertexes of an equilateral polygon having n sides, n being an odd number which is equal to or greater than 3, wherein:

the light reflector comprises a plurality of projected portion sets or recessed portion sets, each of said projected portion sets or recessed portion sets consisting of said n first projected portions or recessed portions; and said plurality of projected portion sets or recessed portion sets are constructed such that at lease two of said plurality of projected portion sets or recessed portion sets are arranged around one of said plurality of projected portion sets or recessed portion sets, each of said at least two projected portion sets or recessed portion sets being adjacent to said one projected portion set or recessed portion set.

7. A liquid crystal display device as claimed in claim 6, wherein said plurality of projected portion sets or recessed portion sets are constructed such that six of said plurality of projected portion sets or recessed portion sets are arranged around one of said plurality of projected portion sets or recessed portion sets, each of said six projected portion sets or recessed portion sets being adjacent to said one projected portion set or recessed portion set.

8. A liquid crystal display device comprising pixel electrodes formed at areas corresponding to pixels, respectively, each pixel being associated with a light reflector having a plurality of n first projected portions or recessed portions at positions corresponding respectively to vertexes of an equilateral polygon having n sides, n being an odd number which is equal to or greater than 3, wherein the number of said first projected portions or recessed portions is seven.

9. A liquid crystal display device comprising pixel electrodes formed at areas corresponding to pixels, respectively, each pixel being associated with a light reflector having a plurality of n first projected portions or recessed portions at positions corresponding respectively to vertexes of an equilateral polygon having n sides, n being an odd number which is equal to or greater than 3, wherein:

the light reflector comprises a plurality of projected portion sets or recessed portion sets, each of said projected portion sets or recessed portion sets consisting of said n first projected portions or recessed portions; and in the case of defining respective lines connecting adjacent projected portions or recessed portions of said n first projected portions or recessed portions with respect to each of said plurality of projected portion sets or recessed portion sets, said respective lines associated with one of said plurality of projected portion sets or recessed portion sets extend in directions which are different from those of said respective lines associated with remaining projected portion sets or recessed portion sets.

* * * * *